UNITED STATES PATENT OFFICE.

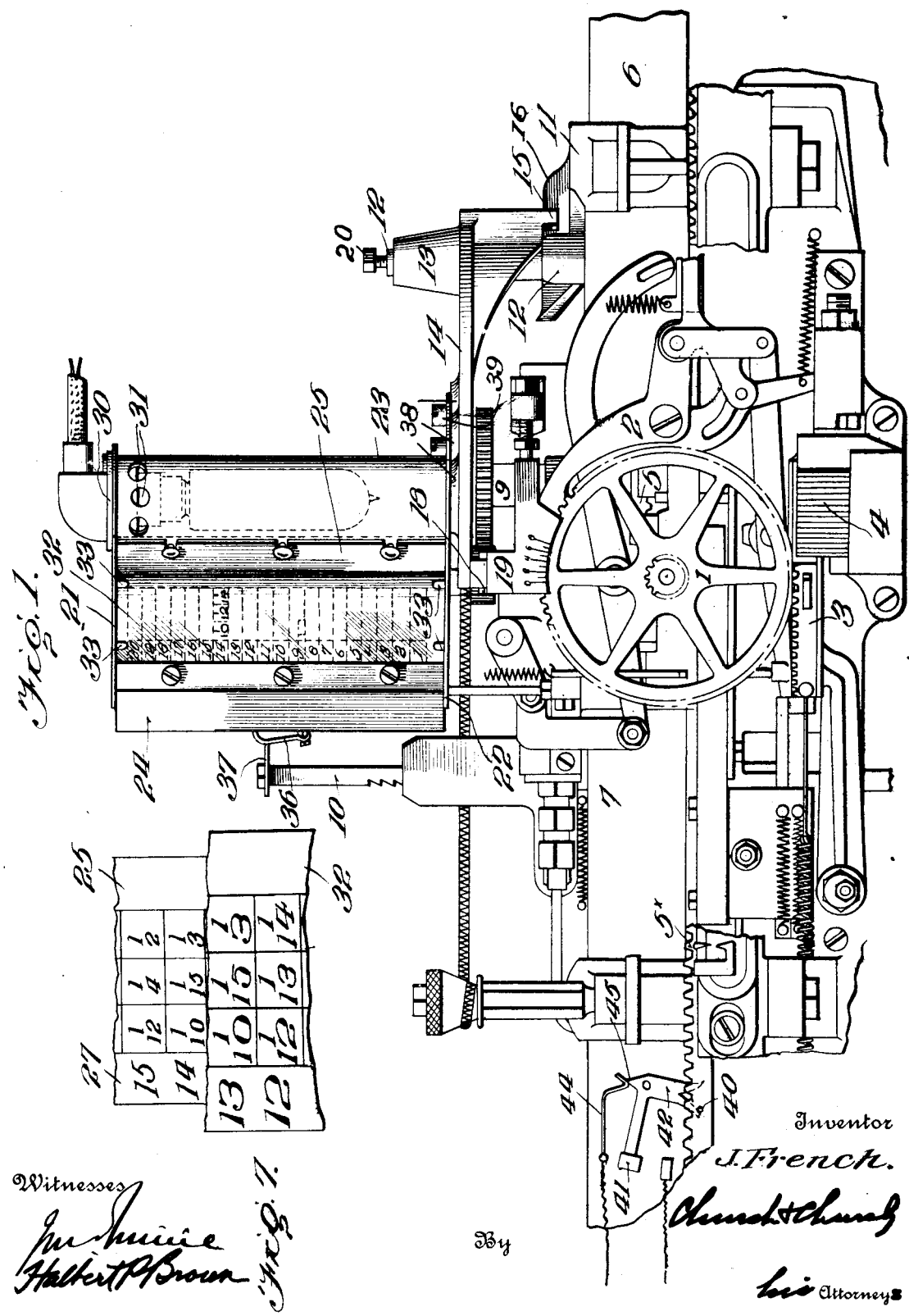

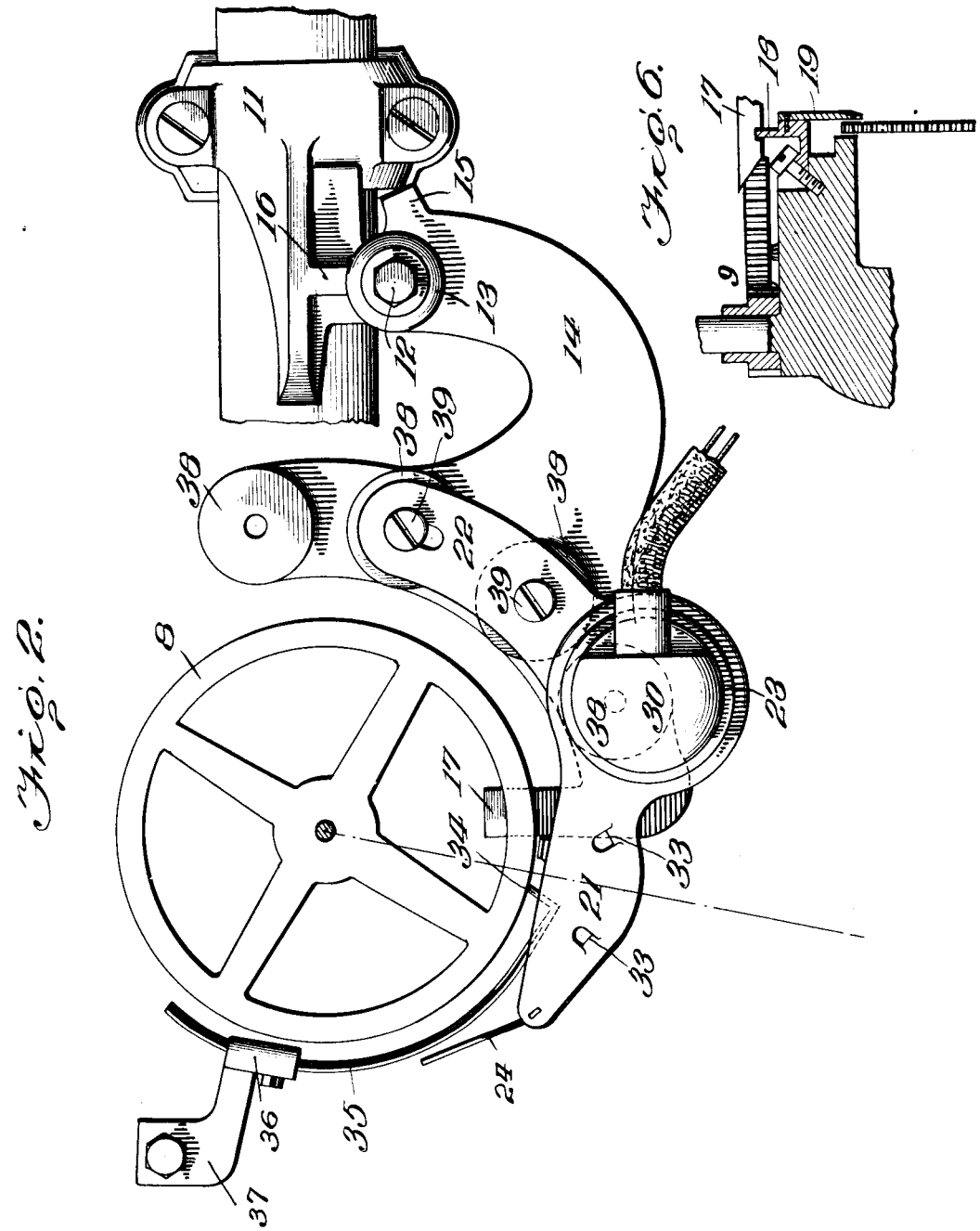

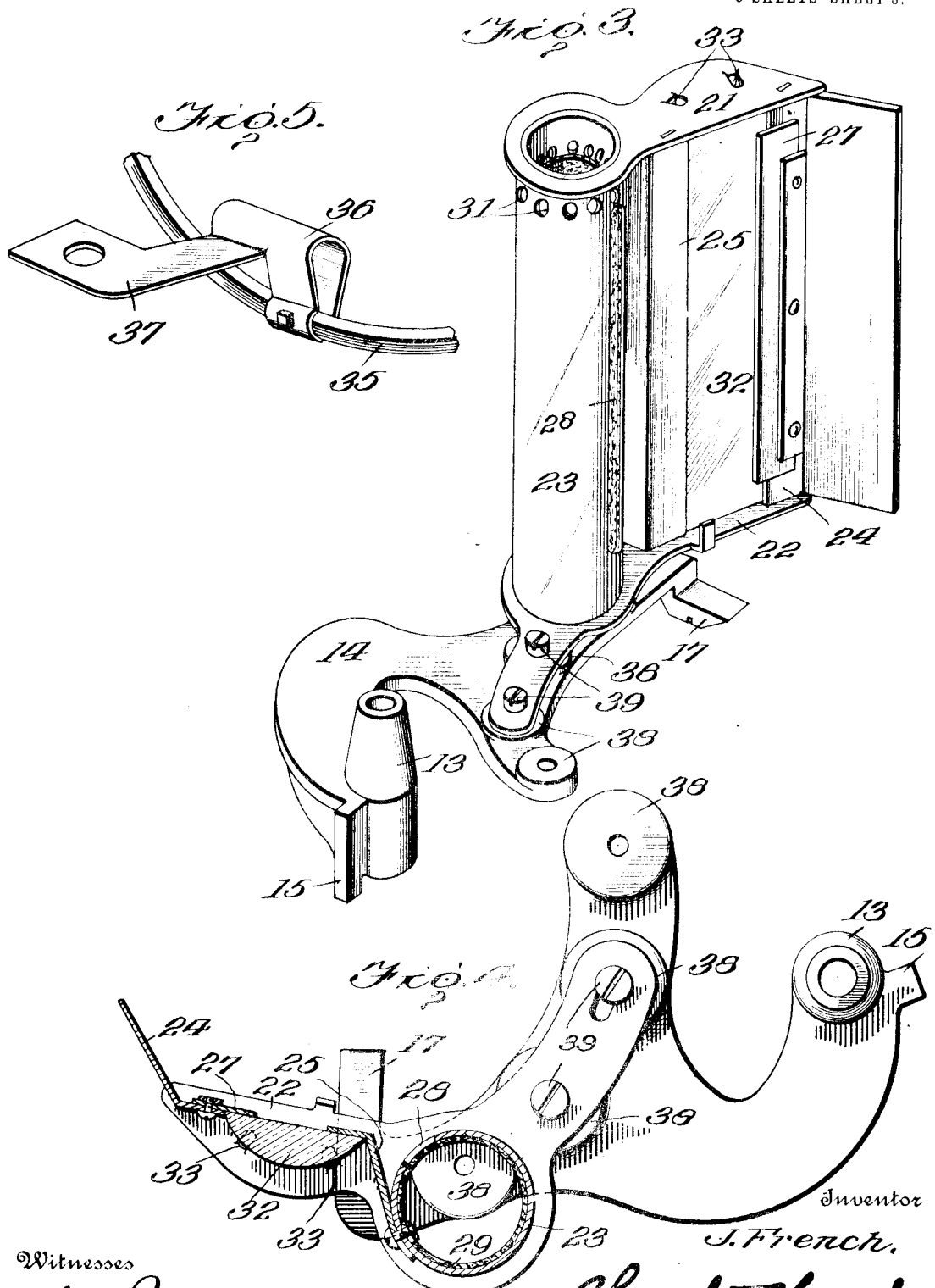

JOSEPH FRENCH, OF PHILADELPHIA, PENNSYLVANIA, ASSIGNOR TO LANSTON MONO-TYPE MACHINE COMPANY, OF PHILADELPHIA, PENNSYLVANIA, A CORPORATION OF VIRGINIA.

TYPOGRAPHIC COMPOSING-MACHINE.

1,117,487. Specification of Letters Patent. Patented Nov. 17, 1914.

Application filed March 12, 1914. Serial No. 824,185.

*To all whom it may concern:*

Be it known that I, JOSEPH FRENCH, a citizen of the United States, residing at Philadelphia, in the county of Philadelphia and State of Pennsylvania, have invented certain new and useful Improvements in Typographic Composing-Machines; and I do hereby declare the following to be a full, clear, and exact description of the same, reference being had to the accompanying drawings, forming part of this specification, and to the figures and letters of reference marked thereon.

This invention relates to improvements in justification indicator mechanism for typographic machines and has for its principal object to facilitate the reading of the index, to which end the invention consists in the construction, arrangement and combination of parts hereinafter fully described, the novel features being specified in the appended claims.

In the accompanying drawings illustrating a preferred form of embodiment, Figure 1 is a front elevation of the line measuring and justification indicating mechanism of a typographic composing machine with the improved attachment applied thereto. Fig. 2 is a top plan view of the attachment shown in connection with the indicator drum. Fig. 3 is a perspective of the attachment viewed from the inner or rear side. Fig. 4 is a horizontal sectional view of the attachment. Fig. 5 is a detail view of the pointer holder with a section of the pointer therein. Fig. 6 is a detail view showing the means for locking the swinging frame to the vernier scale support. Fig. 7 is a diagrammatic view illustrating the action of the lens in enlarging the figures of the scale.

The same numerals designate like parts in the several views.

The invention is illustrated as applied to the record strip composing machine of Patent No. 944,405, dated December 28, 1909, to which reference is had for a detailed description of the construction and operation of the composing machine proper. It will suffice for present purposes to designate some of the principal elements of said machine, such as the units wheel 1, holding pawl 2, units rack 3, stop bars 4, motor rack 5, motor cylinder 6, motor return cylinder 7, indicator drum 8, transmitting gears 9 between the indicator drum and motor rack, line scale rack $5^x$, and the pointer carrier 10, the latter connected to and forming part of the space registering mechanism. During its measured advance motor rack 5 picks up and communicates its motion through transmitting gears 9 to the indicator drum 8, the latter carrying a chart divided by two series of parallel lines—longitudinal and circumferential—into squares each containing one or more, usually two, signal indicia designating the justification signals or keys appropriate to different lengths of line and the numbers of justifying components contained in the line. The presentation of the several circumferential divisions is determined by the line measuring mechanism and of the longitudinal divisions by the space registering devices acting through carrier 10 upon a pointer coupled with the latter. Commercial machines of this class are of two kinds, the one provided with single line measuring, space registering and indicator devices, and the other provided with two sets of said mechanism adapted for simultaneous or dissimultaneous action and controlled from a single keybank, after the manner described in Patent No. 925,073, dated June 15, 1909.

Owing to speed requirements the indicator drum must needs be light in weight and as small in dimensions as is consistent with the number of divisions and size of the figures. In practice it is customary to make the divisions approximately $\frac{2}{16}''$ wide and $\frac{3}{16}''$ high, and to insert in each division two figures, one above the other, ranging from one to fifteen each representing a separate factor of the justification signal. This means that the figures must be small and, under conditions of use, more or less difficult for the operator to read, thus affording a fruitful field for mistakes in justification which are only developed and made plain when the record strip is run through the performing member, to-wit, the type casting and composing machine of which the produced record strip is the controller.

The present invention is designed to afford a ready means, in the form of an attachment to the composing machine, for both illuminating and magnifying that portion only of the scale where the reading is to be made, and to enable said attachment to be applied and adjusted to either kind of machine, i. e., to the single or the double indicator machine and to either member of the double machine. To this end the cap 11 of the bracket supporting motor cylinder 6 is formed or provided with a pivot post 12 for receiving the bearing 13 of the plate or bracket 14, the latter furnished with a shoulder 15 in position to engage a stop 16 on cap 11 when said plate is swung outward or away from drum 8, and with a notched portion or latch 17 in position to engage the support 18 of the vernier scale 19 when said plate is swung inward or toward the indicator drum for retaining the attachment in operative position. This swinging movement of the plate is designed to facilitate the adjustment of the supported members hereinafter referred to and to uncover the drum support when it is desired to insert or remove the drum. The vertical movement of bearing 13 on post 12 permits the engagement and disengagement of latch 17, while a screw 20 carried by post 12 serves to detachably secure the bracket in position thereon and prevent accidental displacement.

Detachably and adjustably secured to bracket 14 is a frame or housing composed of top and bottom plates 21, 22, united by a tubular metal casing 23 and by two vertical plates 24, 25, the latter spaced to afford a vertical slit or sight opening which is rendered adjustable in width by the application of a laterally adjustable plate 27 to vertical plate 24. The inner side of casing 23 is provided with a longitudinal slot or opening 28 and within said casing is fitted a tubular lining 29 preferably of asbestos. The upper end of casing 23 is open and forms a socket for the reception of a detachable electric lamp holder 30, the light rays from which are directed through opening 28 upon the longitudinal section of the indicator drum containing the indicia appertaining to the position of adjustment effected by the line measuring mechanism. Openings 31 are provided in the upper end of casing 23 for the escape of heated air. The sight opening is covered by a cylindrical lens 32 the axis whereof is parallel with the axis of the indicator drum, said lens resting against the outer face of plates 25 and 27, positioned by a shoulder on plate 25 and the edge of plate 24, and retained by clips 33 cut from plates 21, 22.

The position occupied by the operator relatively to the indicating drum varies somewhat with the kind of machine. Thus in the single machine the indicator drum is located at or near the center of the keybank, but as the operator usually sits opposite the left hand section of keys the drum is slightly to his right; and in the double machine one drum is situated at an angle to the left and the other at an angle to the right of the operator.

To render the attachment applicable for use in any one of the three positions indicated and to either kind of machine, the pointer 34 coöperating with the indicator drum, is arranged for adjustment circumferentially of the drum (as by providing it with a curved shank 35 concentric or nearly so with the drum and securing the same in a horizontal direction within a clamp 36 carried by a head 37 on the carrier 10) and the lens and light housing is also arranged for adjustment upon its supporting bracket on a line substantially concentric with the surface of the drum so as to preserve the proper focal distance of the lens, as by providing the bracket with a plurality of equally spaced seats 38 and the lower plate 22 with correspondingly spaced openings for the reception of screws 89.

In Fig. 2 the attachment is shown applied to a single machine wherein the line of vision is represented by the broken line radiating from the axis of the drum, in which case the screws are applied to the two intermediate bearings, and by shifting the housing to the right so that the two screw holes register with the two right hand bearings it will be set for the left indicator drum and by shifting it in the opposite direction to register with the two left hand bearings it will be set for the right hand drum of the double machine. As thus constructed the attachment when applied to the machine provides for an effective illumination of the section of the drum containing the column of figures pertaining to the length of line and of the pointer for designating the division of the section appropriate to the number of justification space type recorded in the line without at the same time illuminating unnecessarily other parts of the machine or presenting the light in a position to irritate the eyes of the operator or distract his attention from copy as would be the case if an effective shield such as described was not provided; and by the use of the cylindrical lens the characters which are necessarily made small are magnified as illustrated in Fig. 7 thus enabling them to be readily observed. Plate 27 in rear of the lens is also provided with figures which read in connection with the pointer indicate the number of justifying space type which have been incorporated among the signals composing a line. The illuminated lens is further utilized as a substitute for the signal bell for advising the operator of the entrance of the line measure within the justification area, which is accomplished by providing the lamp circuit with a switch and actuating the same by the line measuring mechanism. For this purpose the line scale rack $5^x$ coupled with and moving in unison with the units wheel is provided with a pin or projection 40, and the movable switch member 41 with two arms 42 in position to be alternately engaged during the reciprocation of the line scale rack. When the line measuring mechanism is reset preliminary to the composition of a line, rack 5ˣ is moved to an extreme position to the left, Fig. 1, and arrested at the beginning of the line measure. During this retrograde movement the left arm 42 is engaged to shift member 41 to open position, thereby extinguishing the lamp. This shift of member 41 takes place as the rack is leaving the justification area and has the effect of projecting the right arm 42 into the path of pin 40, so that upon the reverse or measuring movement of rack 5ˣ said pin will engage the right arm 42 and close the switch as the rack 5ˣ enters the justification area. The action of the switch may be expedited by the application of a spring 44 to an arm 45 carried by member 41, said spring acting to impel the arm in either direction as the latter passes the center and to hold the same in either position, open or closed, preliminary to the reëngagement of pin 40.

Having thus described my invention what I claim as new and desire to secure by Letters Patent of the United States is,—

1. A typographic composing machine equipped with line measuring mechanism and an indicator drum controlled thereby, and in combination therewith, an illuminating device or attachment detachably applied thereto, the same including a pivoted bracket, a housing mounted on said bracket and containing a sight opening extending parallel with the axis of the indicator drum, a cylindrical lens opposite said opening, and a lamp-inclosing casing provided with an opening next the drum and extending longitudinally thereof.

2. In a typographic composing machine such as described, and in combination with the indicator drum and line measuring mechanism thereof, an illuminating attachment comprising a supporting bracket, a housing or frame mounted on said bracket in proximity to the drum and adjustable circumferentially thereof, said frame containing a narrow sight opening extending longitudinally of the drum, a cylindrical lens registering with said sight opening, and a hollow lamp casing adjacent said sight opening provided with a light passage or opening next the drum and extending longitudinally thereof.

3. A typographic composing machine such as described provided with line measuring mechanism and an indicator drum controlled thereby, and in combination therewith, a hollow casing in proximity to said drum and provided with a light opening extending longitudinally of the drum, an electric lamp within the casing, circuit connections for said lamp including a switch, and actuating means for said switch coupled with the line measuring mechanism to operate at a predetermined point in the movement of the latter.

4. A typographic composing machine such as described the same including, in combination, the following elements, to-wit, a rotary indicator; line measuring mechanism coupled with and controlling said indicator; an electric light located in proximity to said indicator; a shield directing the light rays from said light upon a section of the indicator; circuit connections for the light including a controlling switch; and actuating means for said switch controlled by the line measuring mechanism.

5. An attachment for typographic composing machines containing an indicator drum and line measuring mechanism therefor, the same comprising a supporting bracket with means for detachably securing the same to the composing machine; a frame or housing mounted upon the bracket and adjustable thereon concentrically of the drum; said frame comprising top and bottom plates united by a tubular lamp receiving casing having a longitudinal slot or opening in the side next the drum and by parallel plates separated to form a sight opening; and a cylindrical lens supported opposite said sight opening.

6. An attachment for typographic composing machines such as described comprising a bracket provided with a pivot receiving member and a latch member; a housing or frame attached to said bracket and adjustable thereon on a curved line, said housing including a tubular lamp receiving casing provided with a longitudinal slot or opening in one side, plates arranged in parallel with the casing to one side thereof and separated to form a sight opening between them, and a cylindrical lens bridging the sight opening with its axis parallel therewith.

7. In a typographic composing machine such as described and in combination with the line measuring mechanism, indicator drum and pointer carrier thereof, a holder secured to the carrier and provided with means for permitting adjustment of the pointer circumferentially of the drum; an illuminating and magnifying attachment, in proximity to and extending longitudinally of the drum; and a supporting bracket for said attachment provided with means for permitting adjustment thereof circumferentially of the drum; whereby the attachment and pointer can be set to accommodate the different angular positions occupied by the operator in relation to the drum.

8. An illuminating and magnifying attachment for typographic composing machines such as described, the same including in combination the following elements, to-wit: a supporting bracket provided with a pivot receiving socket at one end, a latch member at the opposite end and a plurality of attaching means disposed in a curved line; a housing or frame provided with two attaching means arranged to register with a corresponding number of attaching means on the bracket said frame comprising top and bottom plates united by parallel plates separated to form a sight opening, and a longitudinally slotted lamp receiving casing adjacent said parallel plates; and a cylindrical lens engaging said parallel plates.

JOSEPH FRENCH.

Witnesses:
SAMUEL A. FRASER,
SAMUEL R. DAVIS.